Nov. 11, 1952

A. A. ROTH 2,617,674

PICKUP FENDER

Filed Nov. 21, 1946

Inventor
August A. Roth
By Thomas W. J. Clark
Attorney

A. A. ROTH 2,617,674

PICKUP FENDER

Filed Nov. 21, 1946

Inventor

August A. Roth

By Thomas W. J. Clark

Attorney

Nov. 11, 1952        A. A. ROTH        2,617,674
PICKUP FENDER Filed Nov. 21, 1946        7 Sheets-Sheet 7

Inventor
August A. Roth.
By Thomas W. J. Clark
Attorney

Patented Nov. 11, 1952

2,617,674

UNITED STATES PATENT OFFICE 2,617,674

PICKUP FENDER

August A. Roth, Baltimore, Md.

Application November 21, 1946, Serial No. 711,244

7 Claims. (Cl. 293—36)

1

This invention relates to a safety fender for a motor vehicle such as a bus or truck or private passenger car.

Applicant has two prior Patents Nos. 2,157,147 and 2,179,163, dated May 9, 1939 and November 7, 1939, respectively and others. Although in actual use these latter fenders have proven quite satisfactory, certain wear points have been discovered which interfere with the ease of operation of the fender and it has been found most desirable to mount the fender in such a way that it will not rattle. Also with the larger buses now in use and the more general use of buses for public transportation it has been found desirable to make the fender foldable from inside the bus, that is, automatically foldable, and in order that buses and other vehicles can be placed in the smallest possible space for storage it has been found desirable to have the fender withdrawable under the vehicle so that in storage the fender takes no additional space.

Another object of the invention is to construct the fender body itself so that it has a substantially horizontal outer rigid rim made substantially of one continuous member with rear tubes comprising the rest of the fender, and running parallel to the front large tubes, which are depressed to give a hammock or basket configuration to the body of the fender so that if one were caught on it he would not only have a firm hand grip all around the outside of the fender including the ends near the sides of the vehicle and also a firm rear hand grip at the rear of the fender at the ends but so that there would be a basket seat to catch the body struck with reasonable assurance of holding the body and not permitting the body to fall from the fender. Another advantage of the instant fender is that the grab bar may be folded out of the way of the hood of the automobile when that hood must be raised for attending to the motor. And the grab bar extends around the lights, and is yielding, in case the head of a person strikes it.

Other objects and advantages of the invention will be apparent from the following description and the accompanying drawings in which.

2

In the drawings similar numerals refer to similar parts throughout the several views.

The motor vehicle 1 has the customary bumper 2 and the fender 3 is attached to the chassis of the vehicle. Projecting upwardly from the mounting of the fender are the collision uprights 4 holding the grab bar 5.

Figure 1:
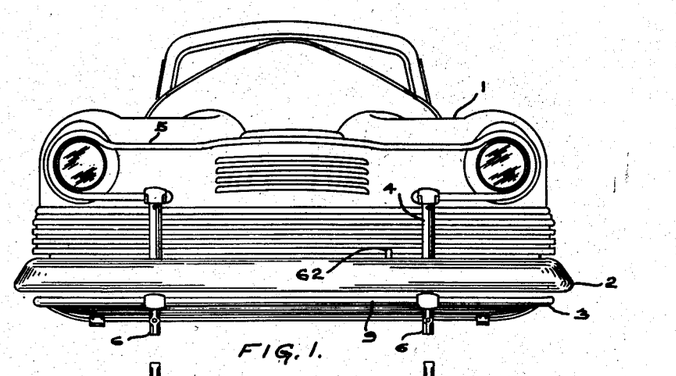
Figure 1 is a front view of a motor vehicle with the fender in place.
Figure 2:
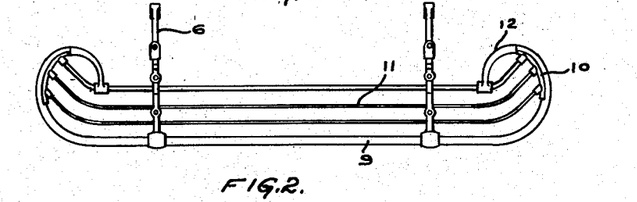
Figure 2 is a top plan view of the fender separated from the vehicle.
Figure 3:
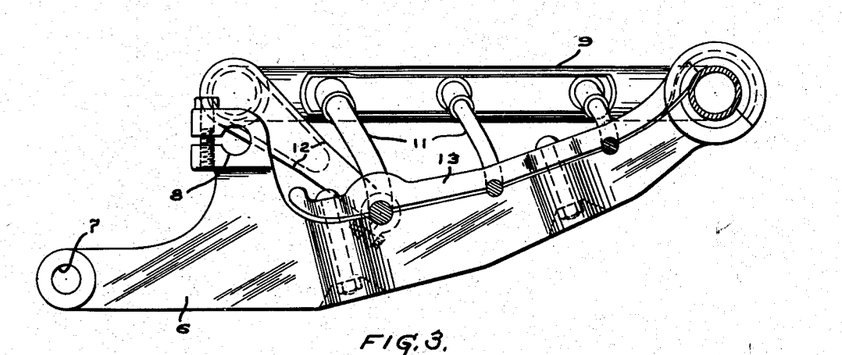
Figure 3 is a longitudinal cross-sectional view of the fender.
Figure 7:
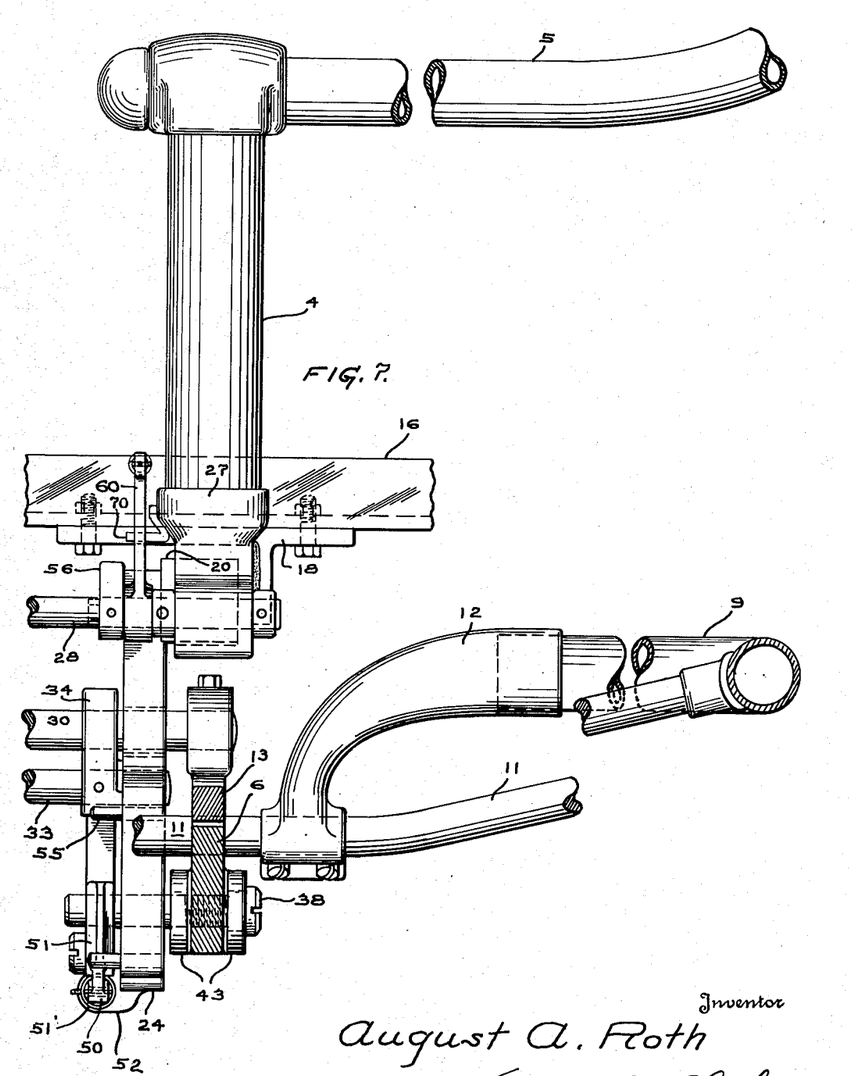
Figure 7 is a vertical sectional view on line 7—7 of Figure 4.
Figures 8, 9, 10:
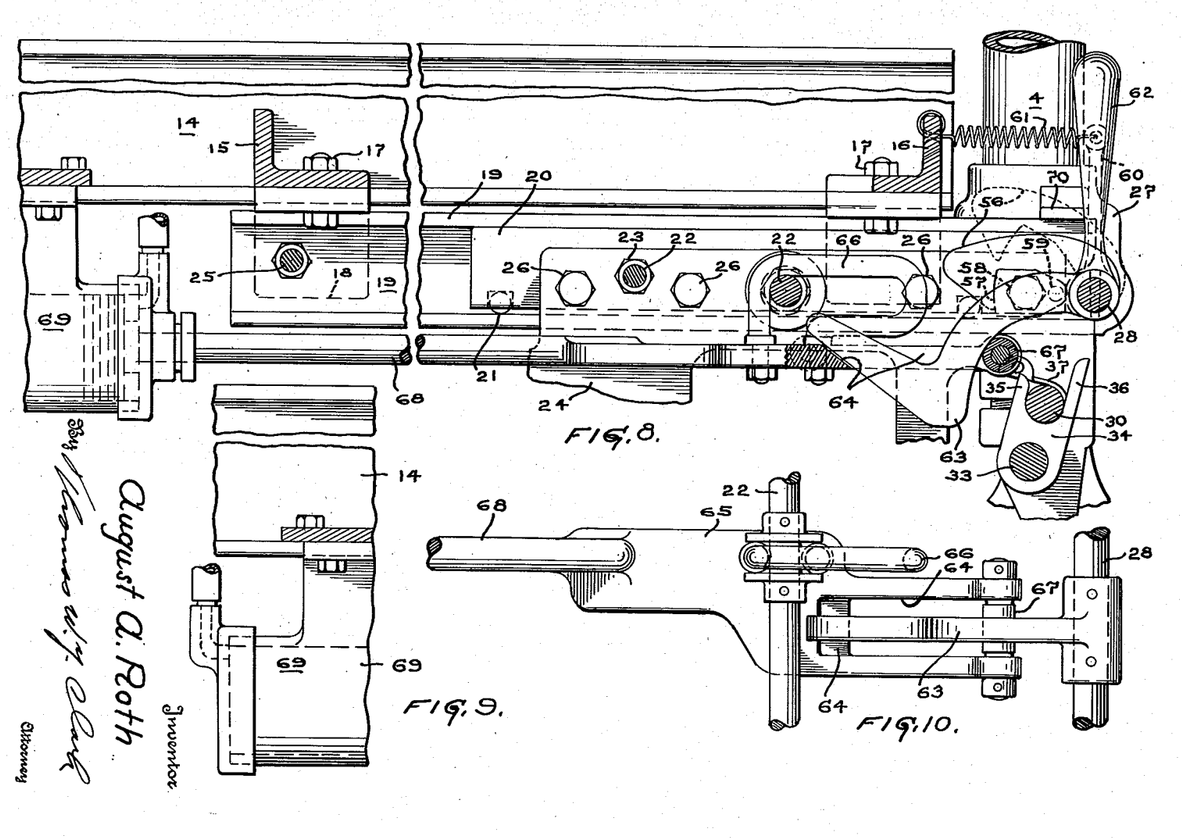
Figure 8 is a longitudinal partially sectional and partially broken view showing the automatic means for retracting the fender under the vehicle.
Figure 9 is a continuation of Figure 8 to the left.
Figure 10 is a top plan view of the latch releasing mechanism of Figure 8.
Figures 12, 13, 14:
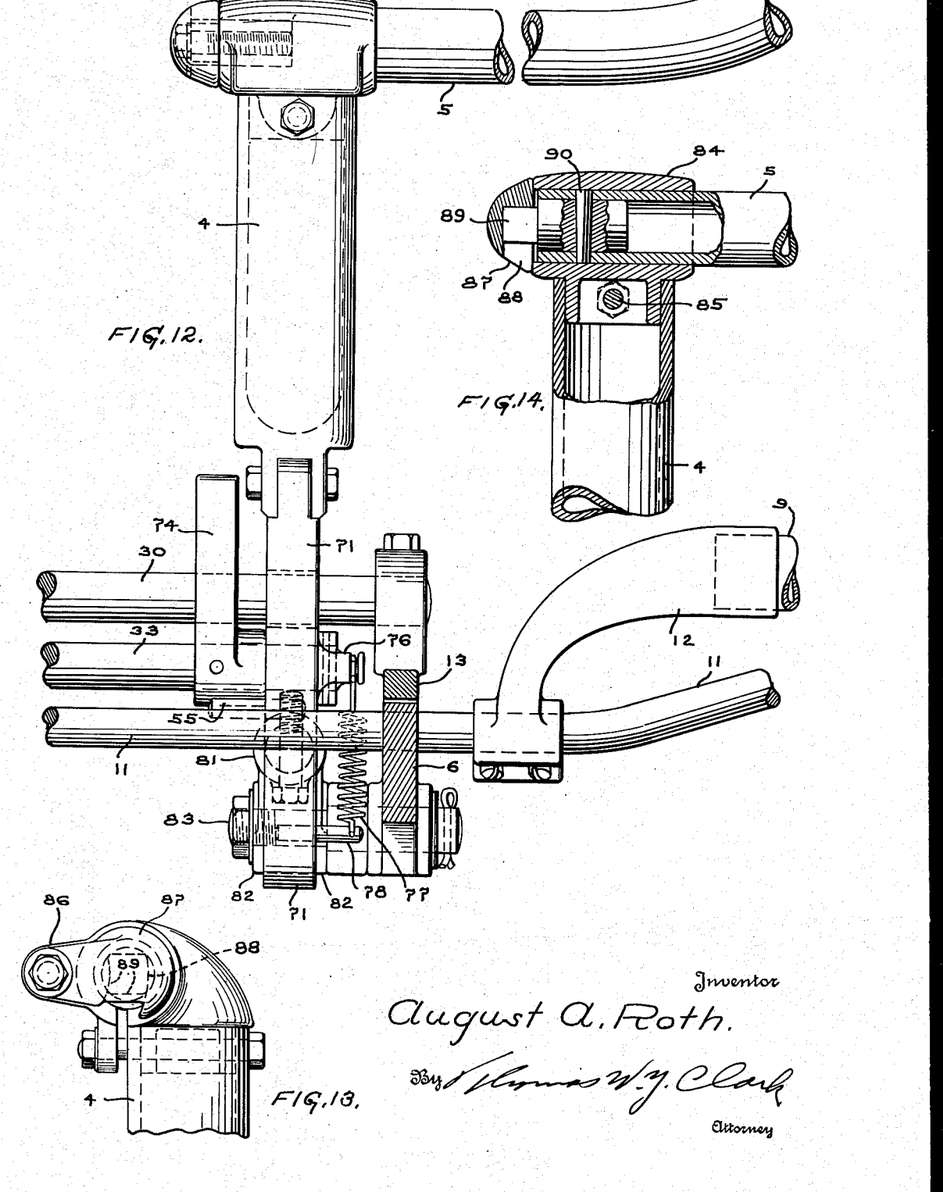
Figure 12 is a vertical sectional view on line 12—12 of Figure 11.
Figure 13 is a side elevation of the grab bar supporting mechanism.
Figure 14 is an irregular sectional view of the grab bar supporting mechanism.

The fender has two arms 6 having sockets 7 and 8 at the rear for mounting the fender and an outer large tubular member 9 extending across the front of the fender which has welded plates 10 at the curved ends in which are mounted smaller tubular members 11 which are bent down to a basket formation as shown in Figures 1 and 3. The ends of the member 9 are curved backwardly where they are inserted in horns 12 having a grip at the ends to fit firmly over the rear rod 11 as shown in Figures 2, 7 and 12. Clamps 13 hold the rods on arms 6. With this construction if one were struck just behind the knees or slightly below the knees by the fender it would of course, according to the disclosure hereinafter, be lowered, but in that lowering the unhappy pedestrian would be able to sit down and reasonably well hold on either to the horn 12 if he were caught at the side of the car or at rod 9 or one of the rear rods or the upper grab bar 5 and he could adequately maintain his balance until the vehicle was brought to a stop. Because of the basket formation there would be no tendency for him to roll or slide from the fender.

In the form of the invention shown in Figures 4 to 10 inclusive, the chassis channels 14 have angle bar adapters 15 and 16 bolted thereto by bolts 17 and to these angle bar adapters are bolted brackets 18 to which are welded longitudinally extending channels or guides 19. Adapters 15 and 16 have slots 18' therein for bolts 18'', to hold brackets 18 thereon to adapt the fender to vehicles of different widths. Slide bars 20 operating on rollers 21 move in these channel guides 19 and the bars are held apart by rods 22 which are reversely threaded at their ends and have lock nuts 23 thereon. These rods extend with their threading through the guide plates 24 and partially through the slide bars 20, to obtain absolute rigidity of formation of the fender carriage thus constructed.

A spacing and holding rod 25 is likewise placed with reversed threads and lock nuts at the rear ends in the channels 19. The guide plates 24 are also fastened by screws to the slide bars as shown at 26. A casting 27 is welded to the top and front of each channel guide 19 as shown in side elevation in Figures 4 and 8 and front elevation in Figure 7. These castings have openings for the latch rod 28 therein and the orifices for the collision uprights 4 to hold them firmly in a vertical position in the front of the vehicle.

Figure 4:
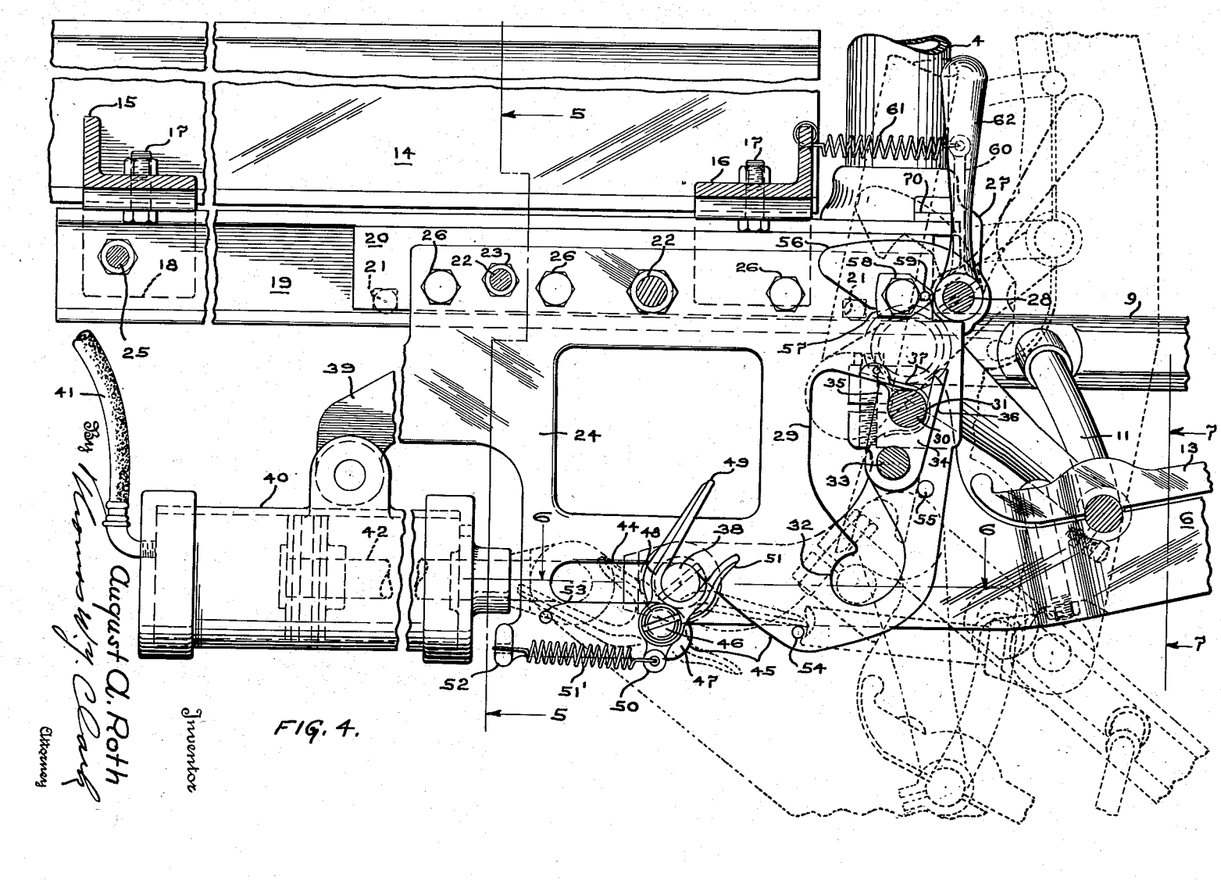
Figure 4 is a longitudinal partially sectional and partially broken view showing the automatic means for folding the fender upwardly.
Figures 5, 6:
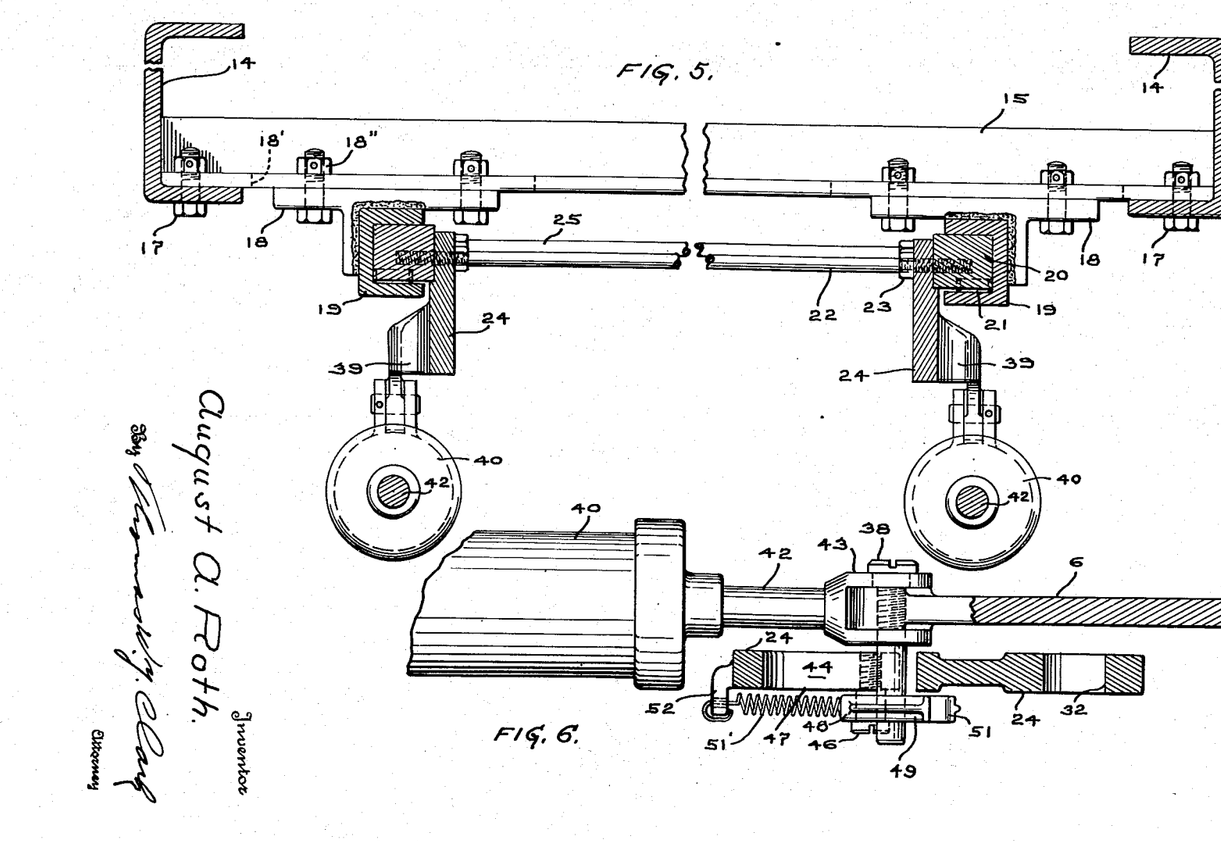
Figure 5 is a vertical sectional view on line 5—5 of Figure 4.
Figure 6 is a horizontal sectional view on line 6—6 of Figure 4.
Figure 11:
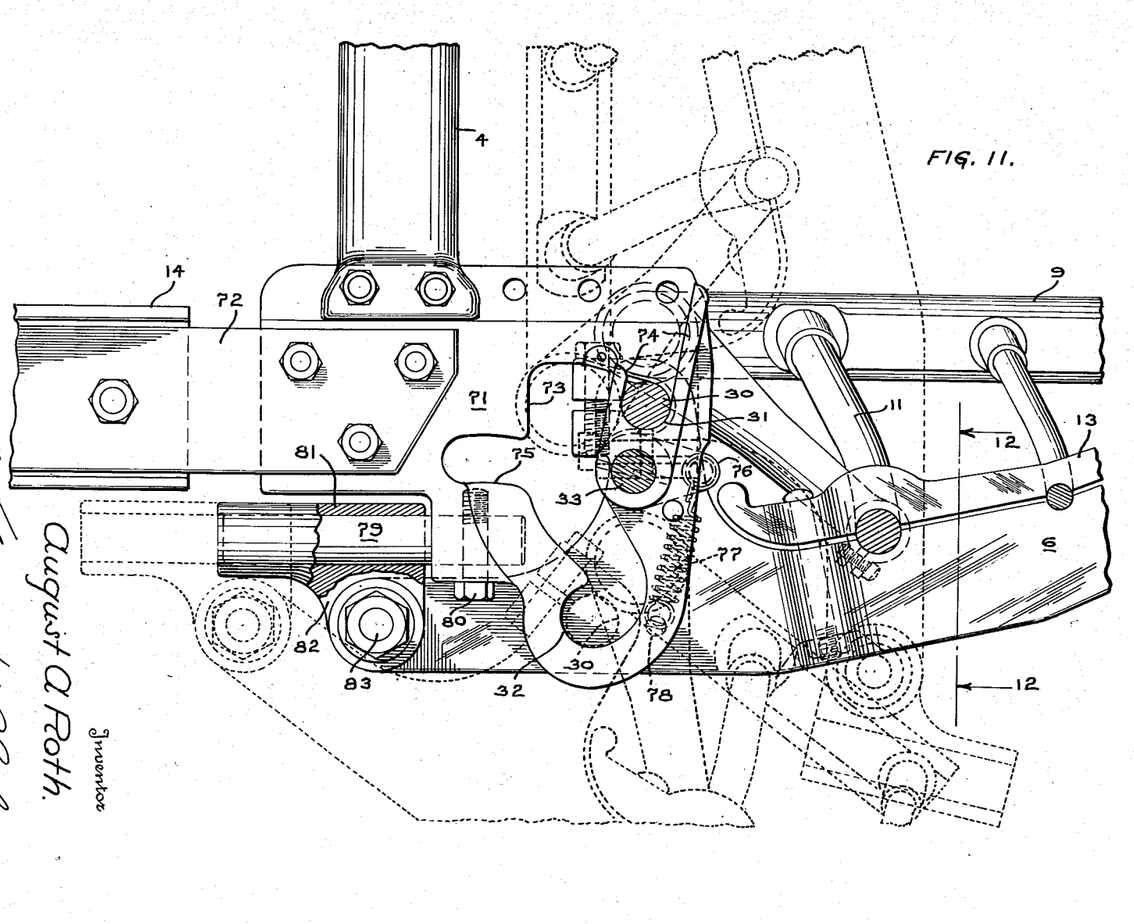
Figure 11 is a longitudinal sectional view showing a modified form of the fender mounting mechanism.

The guide plate 24 has a cam track 29 near its front end having riding therein follower rod 30 firmly held by screws in sockets 8 at the top of the arms of the fender. The cam track 29 is generally of S formation with a top front recess 31 for the follower rod 30 when the fender is horizontal and a lower rear recess 32 for the follower rod when the fender is in scooping position as shown at Figures 4 and 11 in dotted lines.

There is a similar guide plate 24 on each side of the vehicle mounted as above described and between these guide plates extends an upper fork rod 33. This rod rotates freely in sockets in front of guide plates 24 which sockets are placed just to the rear and beneath the recess 31 in the cam track 29. Rigidly fixed to this fork rod 33 are forks 34 having a short rear prong 35 and a longer forward prong 36. The holding bottom part of this fork, in which the follower rod rests, extends high enough above the lower part of the cam track 29 at the recess 31 to take the vertical thrust of the follower rod when the fender is in horizontal position. In practice it has been found that the thrust is better received and held by the forked member than the recess 31 because the recess 31 tends to wear into a pocket formation at the bottom due to vibration and thereby it makes difficult the release of the follower rod 30 from that pocket. However, when the weight is taken by the swinging movable fork, the wear is much less, and of course with the rear tilting of the fork the weight is held by the fork until released to fall down through the cam track 29 to the recess 32. It has been found desirable to place a hardened lining 37 in the recess 31 to avoid excessive wear of that recess.

The lower rear socket 7 of the fender arm 6 has a shouldered bolt 38 fast therein. Projecting from an arm 39 on guide plate 24, and pivoted thereto is a cylinder 40 having a compressed air connection 41 through which the driver at his seat can admit compressed air to the rear of cylinder 40. The cylinder has a piston rod 42 therein with a yoke 43 between the prongs of which the fender arm 6 is placed and through the sockets in the ends of which the bolt 38 passes. Thus operation of the piston rod 42 moves the fender arm substantially horizontally at its rear end.

The guide plate 24 also has a horizontal oblong path 44 therein having forward opening 45. The middle portion of bolt 38 rides in this path and out of it at opening 45 upon folding the fender vertically. Mounted on a shouldered screw 46 on the projecting tongue portion 47 of the guide plate 24 is a vertically swinging fork 48 with a short forward prong 51 and a long rear prong 49 and a lower projecting arm 50 pulled by a spring 51 to the rear, the other end of the spring being mounted in projection 52 on guide plate 24. A stop 53 limits the rear tilting of the fork 48 and a stop 54 limits the forward tilting of the fork.

In operation bolt 38 is in the forward portion of the horizontal track 44 when the fender is horizontal. It is held in this forward position by the fork 48 pulled by spring 51' and also by the friction of the piston in cylinder 40, although no air pressure is placed on the cylinder except when it is desired to raise the fender vertically.

When a body is struck the fender tends to slide horizontally to the rear. Forks 34 drop follower rod 30 to recesses 32 and at the same time against the force of the springs 51' bolts 38 tilt the forks 48 backward in the horizontal paths 44 to the position shown in dotted lines in Figure 4 at which time the fender is in scooping position as shown in this figure and the fork is resting against stop 53. When the fender has fallen to scooping position the fork 34 falls to the dotted line position shown in Figure 4 where it is held by stop 55 with the fork opening in the lower part of the cam track 29. After having saved the person collided with, the fender is raised by hand, the follower rod 30 being lifted and turning the fork 34 upwardly vertically and pulling it forward so that the fender again is in the horizontal position shown in Figure 4.

When it is desired by the operator to fold the fender vertically upwardly as shown in dotted lines in Figure 4, he only need place pressure on the cylinder 40, at which time bolt 38 is moved first horizontally in the track 44 and then it is curved down around the lower forward edge of guide plate 24 and it leaves this guide plate to push the fender to the vertical position shown in dotted lines in Figure 4. When the fender is lowered pressure must be released from the cylinder and gravity will bring the fender back to fork 48 which has been lowered with the rear prong resting on stop 54 and the fork will guide the bolt 38 back into the horizontal path 44 to the horizontal position for the fender as shown in solid lines in Figure 4.

The guide plates 24, being mounted on slide bars 20, are held forward by latches 56 on latch rod 28, the grip of the latch fitting over members 57 held by hex screws 58 and by stud pins 59 from rotating.

Latch rod 28 has extending therefrom the arm 60, held by spring 61 attached to adapter angle 16 to hold the latch in latching position. The latch 56 may be raised by hand by lever 62.

Latch rod 28 has thereon an extending lever 63, with a lower projecting end, projecting in slot 64 in plate 65 on which is mounted loop 66 riding on forward spacing rod 22. Plate 65 has at its forward end roller 67 to contact the forward edge of the lever 63 to raise the lever and release the latch 56, upon moving the plate 65 rearwardly. The plate 65 may be moved rearwardly by integrally connected piston rod 68 operated by air admitted to cylinder 69 which is swung from the center of the chassis of the vehicle. This whole latch releasing mechanism is at the center of the vehicle. When the piston rod 68 is moved to the rear by the admission of pressure to the forward end of the cylinder 69 the loop 66 allows sufficient movement to the plate 65 to lift the lever 63 to release the latch 56 before actually pulling the slide bar 20 back by rod 22, and thereby pulling the fender back under the vehicle. A stop 70 limits the rearward movement of arm 60 and the downward movement of the latches 56. The fender may be pushed back by hand, if desired, after pulling lever 62.

An alternate form of mounting, for folding the fender vertically by hand, is shown in Figures 11 and 12. In this form an adapter plate 71 is connected by plates 72 to the channels 14 of the chassis. The adapter plate has a cam track 73 in its forward end similar to the cam track 29. A fork 74 is on an identical fork rod or shaft 33. The follower rod 30 is similarily held fixedly in sockets 8 in the fender arms 6. The cam track has a rearward opening 75 to allow for the rearward moving of the follower rod 30 thereinto.

In this modification the fork 74 is held forward, from vibrating, by means of arm 76 on shaft 33 which is pulled downwardly by spring 77 held by pin 78 on adapter plate 71.

A rod 79 is held fast by screw 80 in this adapter plate 71. A cylindrical sliding member 81 has on its lower side a mounting 82 through which and the socket 7 in the end of arm 6 of the fender passes bolt 83. The cylindrical member 81 slides freely on the rod 79 when the fender strikes a body to allow the fender to fall to scooping position. This position of the member 81 and the scoop is shown in dotted lines at the lower left side of Figure 11.

When it is desired to fold the fender vertically, this may be done by hand by pushing the fender to the rear and in that passage somewhat supporting it so that the follower rod 30 goes into the rear opening 75 of the cam tract and then the cylindrical mounting 81 slides from the rod 79 and allows the free movement of the fender to the vertical position shown in dotted lines to the right in Figure 11. When the fender is folded in this position and after the release of the cylindrical members 81 from the rods 79 the cam follower is brought back to its position in the forks 74 to the upper forward recesses in the cam tracks 73 and in that position the springs 77 hold the forks resiliently forward.

In this modification the collision uprights 4 are bolted to the adapter plate 71 in any of the openings provided in the top of that plate as shown in Figure 11, the precise position being determined by the formation of the hood of the vehicle to which the fender is attached.

The grab bar 5 is attached to collision uprights 4 by passing through mounting 84 bolted at 85 to the uprights 4. Mounting 84 has an extending arm 86 to which is pivoted a locking member 87 having a generally rectangular inner groove 88 which fits over a similarily shaped head 89 held by pin 90 in the end of grab bar 5.

As shown in Figure 1 the grab bar extends vertically upwardly when in use. When it is desired to pull it forwardly to get it out of the way of raising the hood of the vehicle, the latch 87 is raised and this allows the bar 5 to tilt and pivot in the mounting 84 and to swing down against the uprights 4 and the hood of the vehicle may then be raised at will. It will be apparent that upon turning the grab bar vertically upwardly again and refastening the latch 87 over the head 89 the bar will again be in its proper position for grasping in the event of accident.

The operation of the fender in its preferred mechanical form, both to raise it vertically and to slide it horizontally beneath the vehicle, and in the hand manipulated form to raise it vertically, it will be apparent from the above detailed description.

It will also be apparent that many modifications may be made in the precise structures illustrated and described without departing from the invention as defined in the following claims.

What is claimed as new and is desired to be secured by Letters Patent is:

1. In a vehicle fender having a cradle extending substantially horizontally on a vehicle chassis which is lowered to scooping position upon impact with a body, the mounting means for the fender including a guide plate having a cam track therein, the fender having a follower rod riding in said track, the track having an upper forward recess therein, a fork pivoted to the forward edge of said track to swing vertically, the fork pivot center being to the rear of the follower rod center when the rod is in said recess, the pivoted fork extending upwardly beyond the adjacent curvature of the upper forward recess to support the vertical thrust of the follower rod when the latter is in the recess, and the bottom of the recess is then spaced from the rod and vibrations of the rod vibrate the fork on its pivot, free from horizontal contact with the recess.

2. In a vehicle fender having a cradle extending substantially horizontally on a vertical chassis which is lowered to scooping position upon impact with a body, mounting means for the fender including a guide plate having a cam track therein, a pivot on the lower rear end of the fender, the fender having a follower rod riding in said track the rear pivot and the rod supporting the fender in a horizontal or a lower to scooping position, means to raise said fender substantially vertically to folded position comprising a hydraulically operated cylinder pivoted to said guide plate having a piston therein pivoted to said rear pivot of the fender, whereby extension of the piston turns the fender upwardly, substantially vertically.

3. In a vehicle fender having a cradle extending substantially horizontally on a vehicle chassis which is lowered to scooping position upon impact with a body, mounting means for the fender including a guide plate having a cam track therein a pivot on the lower rear end of the fender, the fender having a follower rod riding in said track the rear pivot and the rod supporting the fender in a horizontal or a scooping position, means to raise said fender substantially vertically to folded position comprising a hydraulically operated cylinder pivoted to said guide plate having a piston therein pivoted to said rear pivot of the fender, whereby extension of the piston turns the fender upwardly, substantially vertically, the guide plate having a fork pivoted thereon beneath the piston pivot at the fender end, said pivot riding therein, a spring constraining said fork to hold the said pivot to hold the fender in horizontal position and in position to guide the pivot back to hold the fender in horizontal position after the same has been raised substantially vertically and lowered again.

4. In a vehicle fender having a cradle extending substantially horizontally on a vehicle chassis which is lowered to scooping position upon impact with a body, mounting means for the fender including a guide plate having a cam track therein, the fender having a follower rod riding in said cam track, the rear of the fender having a laterally extending pivot thereon, the guide plate having a forwardly opening horizontal slot in which said pivot rides when the fender moves to scooping position, means to move said pivot forwardly from said slot, to tilt the fender up to substantially vertical folded position, and to reverse said forward movement, to return the fender to horizontal position and the pivot to the slot.

5. In a vehicle fender having a cradle extending substantially horizontally on a vehicle chassis which is lowered to scooping position upon impact with a body, mounting means for the fender including a guide plate having a cam track therein, the fender having a follower rod riding in said cam track, the rear of the fender having a laterally extending pivot thereon, the guide plate having a forwardly opening horizontal slot in which said pivot rides when the fender moves to scooping position, means to move said pivot forward, to tilt the fender up to substantially vertical folded position, and to reverse said forward movement, to return the fender to horizontal position, said pivot leaving the slot in the guide plate upon folding the fender and means to guide the pivot back to the guide plate slot when the fender is lowered.

6. In a vehicle fender having a cradle extending substantially horizontally on a vehicle chassis which is lowered to scooping position upon impact with a body, mounting means for the fender including a guide plate having a cam track therein, the fender having a follower rod riding in said track, means to support the follower rod on the fender in an upper position in said track when the fender is horizontal, and the fender having a lower rear pivot which is moved to the rear when the fender is moved to scooping position, longitudinally extending rod and cylindrical means connected to said rear pivot and forming a part of said mounting means and directing longitudinal movement of the fender when the same is moved from horizontal to scooping position, said fender being foldable to substantially vertical position and when folded, said rod and cylinder being disengaged, the cam track having a rearwardly extending recess, the follower being turned into said recess prior to the disengagement of said rod and cylinder when the fender is raised.

7. In a vehicle fender having a cradle extending substantially horizontally on a vehicle chassis which is lowered to scooping position upon impact with a body, mounting means for the fender including a guide plate having a cam track therein, the fender having a follower rod riding in said track, the track having an upper recess therein, a fork pivoted to the forward edge of said track to swing vertically, the fork pivot center being to the rear of the follower rod center when the rod is in said recess, in which the fork extends upwardly to support the vertical thrust of the follower rod when the latter is in the recess, and the bottom of the recess is then spaced from the rod, the fork having an extending arm having a spring attached thereto constraining the fork forward to retain the follower rod in the forward recess.

AUGUST A. ROTH.

REFERENCES CITED

The following references are of record in the file of this patent:

UNITED STATES PATENTS

| Number | Name | Date |
|---|---|---|
| 494,689 | Pfingst | Apr. 4, 1893 |
| 554,495 | Manning | Feb. 11, 1896 |
| 836,283 | Smith | Nov. 20, 1906 |
| 840,180 | Wheelock | Jan. 1, 1907 |
| 888,656 | Rogan | May 26, 1908 |
| 1,343,727 | Jones | June 15, 1920 |
| 1,515,566 | Finnegan | Nov. 11, 1924 |
| 1,783,875 | Ferdinand | Dec. 2, 1930 |
| 2,157,147 | Roth | May 9, 1939 |
| 2,179,163 | Roth | Nov. 7, 1939 |
| 2,203,489 | Conwell | June 4, 1940 |

FOREIGN PATENTS

| Number | Country | Date |
|---|---|---|
| 16,547 | Great Britain | July 11, 1910 |